US009820189B2

(12) United States Patent
Novo Diaz et al.

(10) Patent No.: US 9,820,189 B2
(45) Date of Patent: Nov. 14, 2017

(54) LOAD BALANCING THAT INDIRECTLY ACCOUNTS FOR SELF-MANAGED DEVICES IN CAPILLARY NETWORKS

(71) Applicant: Telefonaktiebolaget LM Ericsson (publ), Stockholm (SE)

(72) Inventors: Oscar Novo Diaz, Helsinki (FI); Nicklas Beijar, Kirkkonummi (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/103,490

(22) PCT Filed: Dec. 22, 2015

(86) PCT No.: PCT/EP2015/080978
§ 371 (c)(1),
(2) Date: Jun. 10, 2016

(87) PCT Pub. No.: WO2016/087682
PCT Pub. Date: Jun. 9, 2016

(65) Prior Publication Data
US 2016/0353326 A1 Dec. 1, 2016

Related U.S. Application Data

(60) Provisional application No. 62/166,351, filed on May 26, 2015.

(51) Int. Cl.
*H04L 12/28* (2006.01)
*H04W 28/08* (2009.01)
(Continued)

(52) U.S. Cl.
CPC ....... *H04W 28/085* (2013.01); *H04L 67/1036* (2013.01); *H04L 67/12* (2013.01); *H04W 76/064* (2013.01); *H04W 88/16* (2013.01)

(58) Field of Classification Search
CPC .. H04W 28/085; H04W 76/064; H04W 88/16
See application file for complete search history.

(56) References Cited

U.S. PATENT DOCUMENTS

2012/0117213 A1* 5/2012 Shaffer ................ H04L 47/726
709/223
2013/0142059 A1* 6/2013 Di Girolamo .......... H04L 12/66
370/252
(Continued)

FOREIGN PATENT DOCUMENTS

CN 102907068 A 1/2013

OTHER PUBLICATIONS

Sachs, Joachim et al., "Capillary Networks—A Smart Way to Get Things Connected", Ericsson Review, vol. 8, Stockholm, Sweden, Sep. 9, 2014, 1-8.
(Continued)

*Primary Examiner* — Charles C Jiang
*Assistant Examiner* — Ryan Kavleski
(74) *Attorney, Agent, or Firm* — Murphy, Bilak & Homiller, PLLC

(57) ABSTRACT

The present disclosure relates to balancing load amongst different capillary-cellular gateways (24) to indirectly account for load attributable to self-managed devices (27) that are not directly managed by a management node (28). Embodiments include a method implemented by a management node (28) that directly manages managed device(s) (26) in capillary network(s) (16). The method comprises determining, for each of the managed device(s) (26), a weight metric that describes a collective load attributable to not only the managed device (26) but also to any self-managed devices (27) that connect to the cellular network (15) via the managed device (26). The method also comprises balancing load amongst the capillary-cellular gateways (24) based on the weight metrics, by requesting that at
(Continued)

least one managed device (26) move its entire collective load to a different capillary-cellular gateway (24) or reduce its weight metric by shedding load.

12 Claims, 9 Drawing Sheets

(51) Int. Cl.
*H04L 29/08* (2006.01)
*H04W 76/06* (2009.01)
*H04W 88/16* (2009.01)

(56) References Cited

U.S. PATENT DOCUMENTS

| | | | |
|---|---|---|---|
| 2013/0188515 A1* | 7/2013 | Pinheiro | H04W 4/001 370/254 |
| 2013/0242943 A1* | 9/2013 | Zhou | H04W 24/02 370/331 |
| 2015/0050954 A1 | 2/2015 | Kameno et al. | |
| 2016/0037432 A1* | 2/2016 | Lin | H04W 8/005 370/329 |
| 2016/0353228 A1* | 12/2016 | Sachs | H04W 4/005 |

OTHER PUBLICATIONS

Unknown, Author, "Lightweight Machine to Machine Technical Specification", OMA: Open Mobile Alliance, Version 1.0, Apr. 7, 2016, 1-127.

* cited by examiner

LOAD BALANCING THAT INDIRECTLY ACCOUNTS FOR SELF-MANAGED DEVICES IN CAPILLARY NETWORKS

TECHNICAL FIELD

The present disclosure relates to capillary networks, and more particularly to load balancing that indirectly accounts for self-managed devices in capillary networks.

BACKGROUND

A capillary network includes a set of devices connected using short-range radio-access technologies (such as Wi-Fi and BLE) to a cellular network. A capillary network has two types of nodes: capillary-cellular gateways and devices, Capillary-cellular gateways (also referred to as capillary gateways. CGWs) have an uplink via a long-range network as well as a short-range network, while devices only have short-range radio-access technology. Capillary networks utilize the leveraging of the cellular networks to globally connect Internet of Things (IoT) devices and integrate security and network management into the IoT paradigm.

Typically, capillary-cellular gateways will include in its network all the IoT devices from the area covered by its short-range wireless technologies. The management node will manage the devices' connectivity through the capillary-cellular gateways. However, in some cases, some IoT devices will not belong to any capillary network. These devices may either not have any granted access to any of the networks, or the devices (or the owner of the device) will prefer not to join a capillary network. Moreover, some devices may not be within the radio range of the capillary-cellular gateway. Instead they will form a multi-hop self-managed network between themselves, with only one or a few of the devices being manageable and within reach of the capillary-cellular gateway.

In those cases, those IoT devices will still need connectivity to the network. One option is that the IoT devices connect to their own wireless or cellular networks. Another option is that the IoT devices connect to another node that belongs to the Capillary network.

In this last case, the management node of a capillary network does not have any means to know if a node outside the capillary network has connected to its managed network. Besides the security treat which represents these types of unknown connections, those nodes could consume the resources of the capillary network and destabilize the load in the different capillary-cellular gateways. Thus, connecting other nodes indirectly to a managed node would disturb the load balancing between the managed nodes.

It is apparent that the capillary networks could restrict the connection of unknown devices to its network. However, in some cases, it might be convenient that those devices connect to the network. Many of those devices might have specific security constraints to be outside a capillary network or might contain private information which the devices do not want to share. Nevertheless, the devices still need some connectivity to some network and might find that connectivity through devices connected to a capillary Network.

SUMMARY

One or more embodiments herein introduce a new method to assign a specific capillary-cellular gateway to a device (e.g. a managed device) that, in turn, connects a set of devices which are not directly managed as part of a capillary network (e.g. self-managed devices). A Capillary-cellular gateway can indirectly handle the nodes that do not belong to the managed capillary network to allow scaling out the capillary network infrastructure. At least some embodiments therefore can optimize load-balancing between capillary-cellular gateways.

According to various aspects of the present disclosure, a method to implement the distribution of devices among the most optimal capillary-cellular gateways is disclosed. Various managed devices may carry a set of nodes (e.g. self-managed devices) that do not belong to a managed capillary network. A management node facilitates the indirect distribution of the load of the self-managed devices among other managed devices or capillary-cellular gateways in the capillary network.

According to one aspect of the present disclosure, for example, a method is disclosed which is implemented by a management node. The management node directly manages one or more managed devices in one or more capillary networks. The method is for balancing load amongst different capillary-cellular gateways to indirectly account for load attributable to self-managed devices that are not directly managed by the management node. The method comprises determining, for each of the one or more managed devices, a weight metric that describes a collective load attributable to not only the managed device but also to any self-managed devices that connect to a cellular network via the managed device. The method comprises balancing load amongst the capillary-cellular gateways based on the weight metrics, by requesting that at least one managed device move its entire collective load to a different capillary-cellular gateway or reduce its weight metric by shedding load.

In one or more embodiments, the management node does not know an identity of the self-managed devices for which the managed device relays traffic, and is only aware of their presence through the weight metrics.

In one or more embodiments, balancing load comprises mapping which capillary-cellular gateways can connect to which devices of a capillary network.

In one or more embodiments, the management node balances load based on receiving from at least one managed device one or more of the following as the weight metric or along with the weight metric: an administrative weight, a battery level, an estimation of the generated traffic per time unit, a utilization level of the at least one managed device, and a utilization level of one or more self-managed devices for which the at least one managed device relays traffic.

In one or more embodiments, requesting that the at least one managed device reduce its weight metric by shedding load comprises requesting that the at least one managed device, which is connected to a first capillary-cellular gateway, shed some of its collective load by remaining connected to the first capillary-cellular gateway and disconnecting one or more of its self-managed devices. It also comprises requesting that any of its self-managed devices which are to be disconnected connect to a managed device of a second one of the capillary-cellular gateways.

In one or more embodiments, a managed device disconnects one or more of its self-managed devices by performing one or both of disconnecting from a self-managed device; or letting a self-managed device disconnect itself based on its receipt of a request to connect to a managed device of a second one of the capillary-cellular gateways.

In one or more embodiments, each self-managed device has a respective numeric identifier that falls within a range. In some of these embodiments, requesting that the at least one managed device reduce its weight metric by shedding load comprises transmitting a request to the at least one managed device that identifies a first portion of the numeric range that is less than the entire numeric range, to disconnect from the at least one managed device any self-managed devices whose numeric identifiers are within the first portion of the numeric range.

In one or more embodiments, balancing load is performed based on a detected load imbalance condition. In some of these embodiments, subsequent to the transmitting of the request that at least one managed device move its entire collective load to a different capillary-cellular gateway or reduce its weight metric by shedding load, a method implemented by the management node comprises receiving an updated weight metric from each managed device that the management node connects to in the one or more capillary networks. The method further comprises, if the updated weight metrics indicate that the load imbalance condition has not been resolved, transmitting an additional request to the at least one managed device that identifies a second portion of the numeric range that is different than the first portion, to disconnect from the at least one managed device any self-managed devices whose numeric identifiers are within the second set of the numeric range.

According to another aspect of the present disclosure, a method is disclosed that is implemented by a managed device in a capillary network for balancing load amongst different capillary-cellular gateways to indirectly account for load attributable to self-managed devices that are not directly managed by a management node. At least one of the capillary-cellular gateways connects the capillary network to a cellular network. The method comprises determining a weight metric that describes a collective load attributable to the managed device and any self-managed devices that connect to the cellular network via the managed device. The method also comprises transmitting the weight metric to the management node; and balancing load amongst the capillary-cellular gateways based on instructions received from the management node in response to the transmitted weight metric, by moving the entire collective load to a different capillary-cellular gateway, or reducing the weight metric by shedding load.

In one or more embodiments, the managed device is connected to a first capillary-cellular gateway, and reducing the weight metric by shedding load comprises: remaining connected to the first capillary-cellular gateway; disconnecting one or more of its self-managed devices; and requesting that any of its self-managed devices which are to be disconnected connect to a managed device of a second one of the capillary-cellular gateways.

In one or more embodiments, disconnecting one or more of its self-managed devices comprise the managed device disconnecting from the self-managed device; or letting the self-managed device disconnect itself based on the self-managed device's receipt of the request to connect to the managed device of the second one of the capillary-cellular gateways.

In one or more embodiments, each self-managed device has a respective numeric identifier that falls within a range; and shedding load comprises transmitting a request to self-managed devices that connect to the cellular network through the managed device. The request identifies a first portion of the numeric range that is less than the entire numeric range, to thereby request that the self-managed devices whose numeric identifiers are within the first portion of the numeric range connect to the managed device of the second one of the capillary-cellular gateways.

In one or more embodiments, a method implemented by a managed device comprises receiving an indication from the management node of a second portion of the numeric range that is different than a first portion and is also less than an entire numeric range. The method comprises transmitting a request to self-managed devices that connect to the cellular network through the managed device that identifies the second portion of the numeric range, to thereby request that the self-managed devices whose numeric identifiers are within the second portion of the numeric range connect to the managed device of the second one of the capillary-cellular gateways.

In one or more embodiments, a method implemented by a managed device comprises updating a determined weight metric by determining whether any self-managed devices have disconnected from the managed device and reporting an updated weight metric to the management node.

In one or more embodiments, the managed device transmits one or more of the following as the determined weight metric or in addition to the weight metric: an administrative weight, a battery level, an estimation of the generated traffic per time unit, a utilization level of the managed device, and a utilization level of any self-managed devices for which the managed device relays traffic.

In one or more embodiments a managed device is aware of the identity of a self-managed device for which the managed device relays traffic. The management node does not know this identity, and is only aware of the presence of the self-managed device through the transmitted weight metric.

In one or more embodiments, the self-managed devices have numeric identifiers that are randomly generated, is a hard-coded value or is the weight metric of the device.

In one or more embodiments, the different capillary-cellular gateways includes a first capillary-cellular gateway is in a first capillary network and a second capillary-cellular gateways in a second capillary network.

In one or more embodiments a weight metric is indicative of a device quantity that reflects a sum of the managed device and any self-managed devices for which the managed device relays traffic.

In one or more embodiments, the managed and self-managed devices use short-range radio access technology, the cellular network uses long-range radio access technology, and the capillary-cellular gateways use long-range radio access technology and short-range radio access technology.

Embodiments herein also include a management node. The management node directly manages one or more managed devices in one or more capillary networks. The management node is for balancing load amongst different capillary-cellular gateways to indirectly account for load attributable to self-managed devices that are not directly managed by the management node. The management node is configured to determine for each of the one or more managed devices, a weight metric that describes a collective load attributable to not only the managed device but also to any self-managed devices that connect to a cellular network via the managed device. The management node is configured to balance load amongst the capillary-cellular gateways based on the weight metrics, by requesting that at least one managed device move its entire collective load to a different capillary-cellular gateway or reduce its weight metric by shedding load.

One or more embodiments include a management node configured to implement a method described herein.

Embodiments herein also include a managed device in a capillary network that balances load amongst different capillary-cellular gateways to indirectly account for load attributable to self-managed devices that are not directly managed by a management node. At least one of the capillary-cellular gateways connects the capillary network to a cellular network. The managed device is configured to determine a weight metric that describes a collective load attributable to the managed device (26) and any self-managed devices (27) that connect to the cellular network via the managed device (26). The managed device is configured to transmit the weight metric to the management node (28). The managed device is configured to balance load amongst the capillary-cellular gateways (24) based on instructions received from the management node (28) in response to the transmitted weight metric, by moving the entire collective load to a different capillary-cellular gateway (24), or reducing the weight metric by shedding load.

One or more embodiments include a managed device configured to implement a method described herein.

One or more embodiments include a computer program comprising instructions which, when executed by at least one processor of a device, causes the device to carry out a method as described herein. One or more embodiments include a carrier containing a computer program as described herein wherein the carrier is one of an electronic signal, optical signal, radio signal, or computer readable storage medium.

Of course, the present disclosure is not limited to the above features and advantages. Indeed, those skilled in the art will recognize additional features and advantages upon reading the following detailed description, and upon viewing the accompanying drawings.

DETAILED DESCRIPTION

Figure 1:
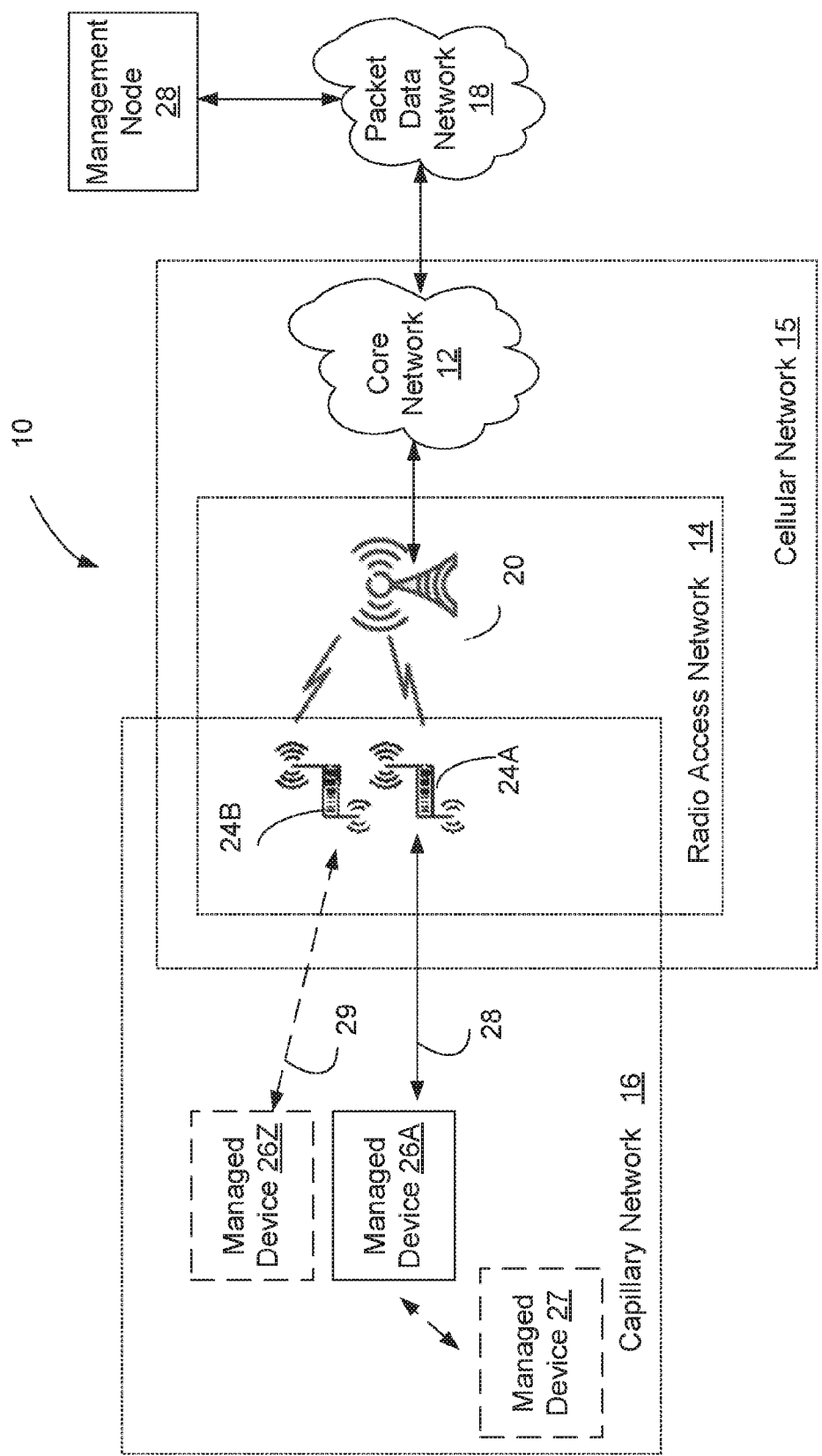
FIG. 1 depicts a block diagram with managed devices and management node according to one or more embodiments herein.

FIG. 1 illustrates an example wireless communication network 10 that includes a core network 12, a radio access network (RAN) 14, and one or more capillary networks 16. The core network 12 and RAN 14 are part of a cellular network 15 that uses long-range radio access technology (e.g. LTE, W-CDMA, GSM). The core network 12 provides a connection to a packet data network 18 (e.g. a wide-area network such as the Internet). The RAN 14 includes a base station 20 that communicates wirelessly with capillary-cellular gateways 24 (e.g. capillary-cellular gateways 24A and 24B) using the long-range radio access technology.

The capillary network 16 includes the capillary-cellular gateways 24 and also includes one or more managed devices 26 (e.g. devices 26A, 26Z) that connect to the cellular network 15 through the capillary-cellular gateways 24. The managed devices 26 use short-range radio access technology to communicate with the capillary-cellular gateways (e.g. Wi-Fi, BLE). The capillary-cellular gateways 24 use both short-range radio access technology and long-range radio access technology to connect the capillary network(s) to the cellular network 15.

A management node 28 directly manages one or more managed devices 26 in the capillary network(s). For example, the management node 28 chooses which capillary-cellular gateways 24 are used by a managed device 26A to connect to the cellular network 15 (e.g. managed device 26A connects via communication pathway 28 to capillary-cellular gateway 24A).

When a managed device 26 uses a particular gateway 24, the managed device 26 contributes to the load on that gateway 24 (e.g., in terms of increased traffic and/or processing). However, this load is attributable to not only the managed device 26 itself, but is also attributable to any self-managed device 27 that is not directly managed by the management node 28 and that connects to the cellular network 15 via the managed device 26. This threatens the ability of the management node 28 to balance the load amongst different gateways 24, since the management node 28 does not directly manage self-managed devices 27.

Figure 2:
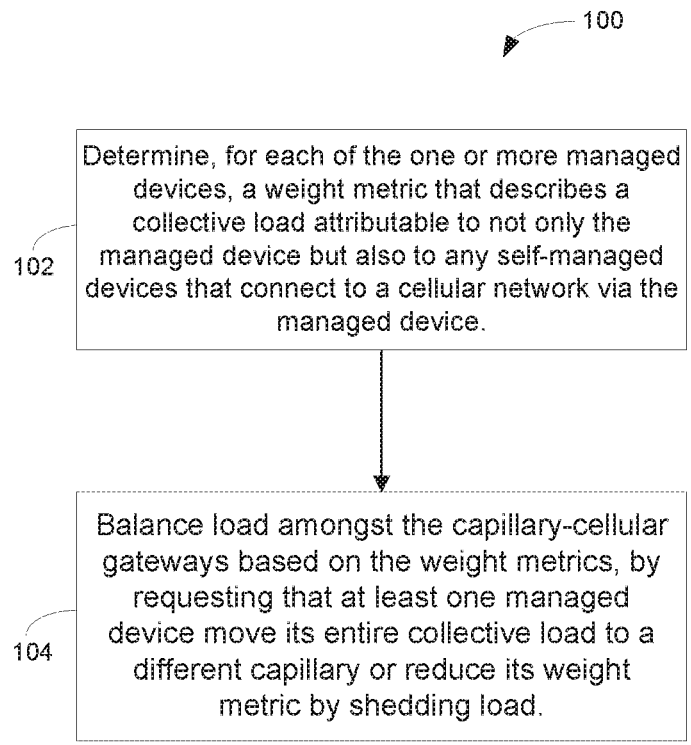
FIG. 2 depicts a logic flow diagram implemented by a management node according to one or more embodiments herein.

In some embodiments, the management node 28 advantageously balances load amongst different capillary-cellular gateways 24 to indirectly account for load attributable to self-managed devices 27 that are not directly managed by the management node 28. FIG. 2 illustrates a method 100 implemented by the management node 28 according to one or more of these embodiments.

As shown in FIG. 2, the method 100 at the management node 28 includes determining, for each of the one or more managed devices 26, a weight metric that describes a collective load attributable to not only the managed device but also to any self-managed devices 27 that connect to the cellular network 15 via the managed device 26. (Block 102). For example, the weight metric in some embodiments is a quantity that reflects a sum of the managed device 26 and any self-managed devices 27 for which the managed device 26 relays traffic.

The method 100 further comprises the management node 28 balancing load amongst the capillary-cellular gateways 24 (e.g., by mapping which gateways can connect to which devices 26) (Block 104). The management node 28 notably balances load amongst the gateways 24 based on the weight metrics, by requesting that at least one managed device 26 moves its entire collective load to a different capillary-cellular gateway 24 or reduce its weight metric by shedding load. (Block 104). For example, the management node 28 in some embodiments requests that a managed device 26A move its entire collective load from capillary-cellular gateway 24A to capillary-cellular gateway 24B.

Figure 3:
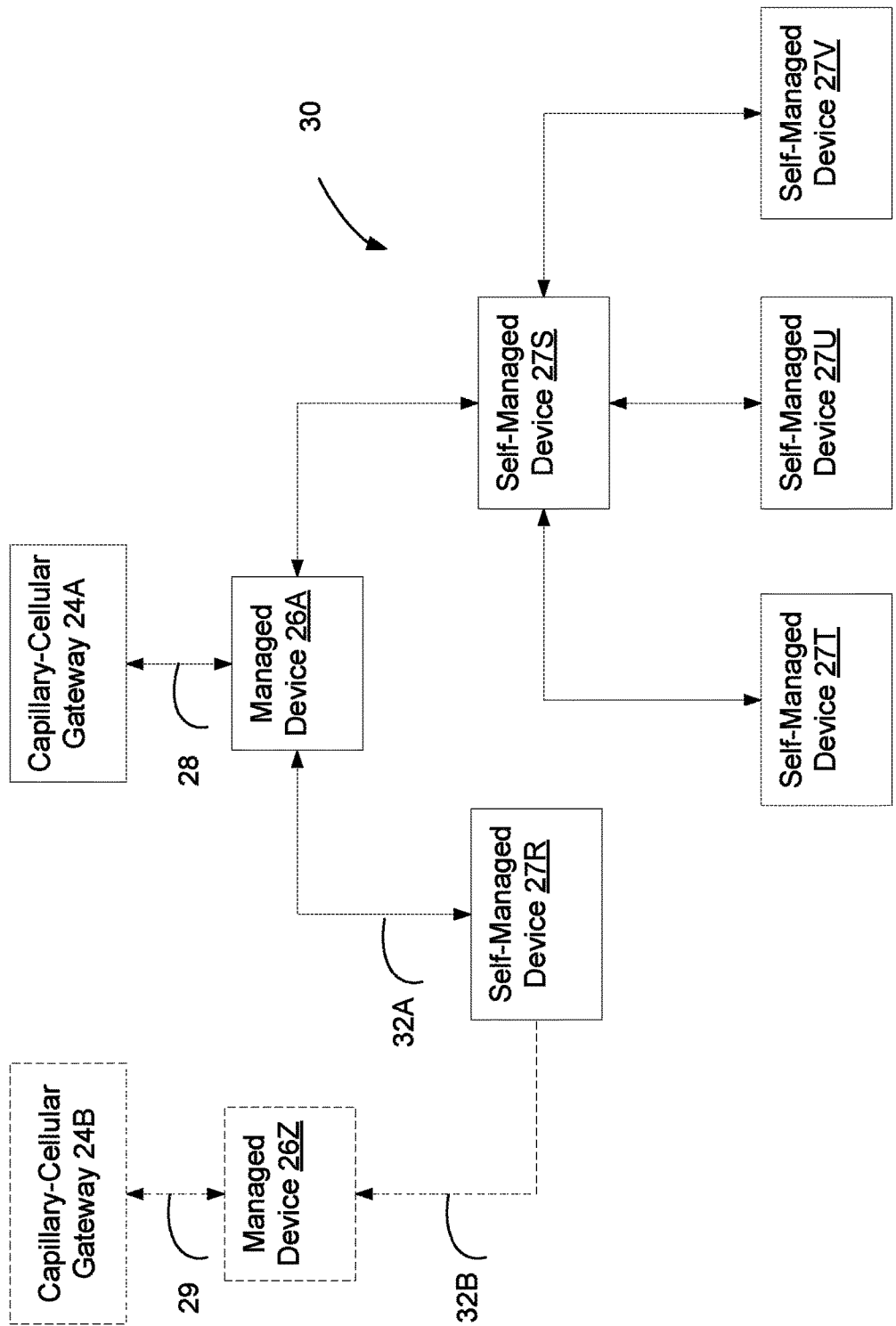
FIG. 3 depicts a block diagram including managed devices and self-managed devices according to one or more embodiments herein.

Embodiments herein provide a solution to indirectly manage the self-managed devices 27 connected to the managed devices 26. Thus, embodiments herein advantageously provide for a management node 28 that can control at least in some degree third-party nodes (e.g., self-managed devices 27) that are connected to their managed capillary network(s) 16. It is therefore possible to indirectly manage self-managed devices and their networks that do not belong to a capillary network 16 (e.g. to implement load balancing across technology and management borders). FIG. 3 shows an example network architecture 30 where multiple self-managed devices 27R and 27S connect to a given managed device 26A. As shown in FIG. 3, other self-managed devices 27T, 27U, and 27V also connect to a given self-managed device 27S. Managed device 26A relays traffic to the cellular network 15 for the connected self-managed devices 27.

In some embodiments, the management node 28 is unable to directly manage the self-managed devices 27 because the self-managed devices 27 are not able to connect to the gateway directly. This may be because they are out of radio range, or they use a different radio or set of communication protocols than the capillary-cellular gateway 24, Indeed, in some embodiments the management node 28 does not even have direct knowledge of the identity and/or existence of the self-managed devices 27. Self-managed devices 27 in some embodiments are therefore third-party nodes that the management node 28 is not able to authenticate or control. These self-managed devices in some embodiments arrange themselves using an ad-hoc protocol or a sensor network routing protocol (such as RPL).

Even though the management node 28 is unable to directly manage the self-managed devices 27, the management node 28 indirectly manages those self-managed devices 27 via the managed device 26A. The management node 28 does so in order to balance the load amongst different capability gateways 24A and 24B. For instance, the management node 28 requests that the managed device 26A reduce its weight metric by shedding load.

In some embodiments, for example, the management node 28 requests that the managed device 26A shed some of its collective load by remaining connected to the first capillary-cellular gateway 24A and disconnecting one or more of its self-managed devices 27 (e.g. self-managed device 27R). The management node 28 in the same embodiment or a different embodiment requests that any of the self-managed devices 27 which are to be disconnected from managed device 26A instead connect via a different capillary-cellular gateway (e.g. one that is less loaded than capillary-cellular gateway 24A). For example, self-managed device 27R moves from its connection to managed device 26A via communication pathway 32A to managed device 26Z via communication pathway 32B. Now, self-managed device 27R reaches the cellular network 15 via capillary-cellular gateway 24B In one embodiment, managed device 26A accomplishes this by either itself disconnecting from self-managed device 27R, or by letting self-managed device 27R disconnect itself (e.g., based on its receipt of a request to connect to managed device 26Z of a different gateway 24B).

In other embodiments, the management node 28 requests that the managed device 26A move its entire collective load (e.g. itself and connected self-managed devices 27R-27V) to a different capillary-cellular gateway 24B.

Figure 4:
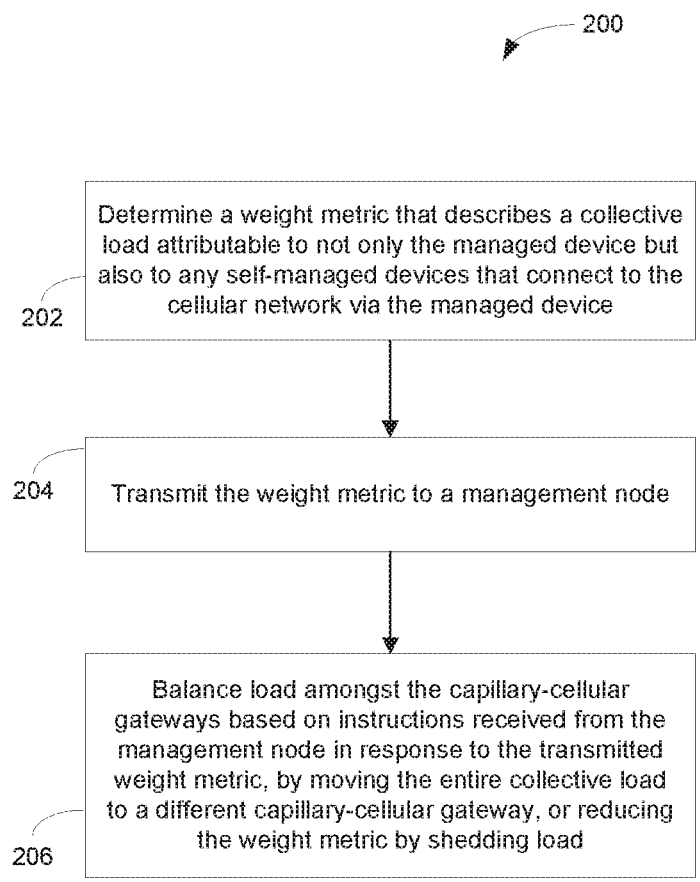
FIG. 4 depicts a logic flow diagram implemented by a managed device according to one or more embodiments herein.

In some embodiments, a management node 28 determines a weight metric from a particular managed device 26 based on receiving that weight metric from the managed device 26. Embodiments herein therefore correspondingly include a managed device 26 configured to transmit a weight metric to the management node 28. FIG. 4 shows an example method 200 in this regard implemented by a managed device 26 in a capillary network 16 (e.g. managed device 26A in FIGS. 1 and 2) for balancing load amongst different capillary-cellular gateways 24 to indirectly account for load attributable to self-managed devices 27 that are not directly managed by a management node 28.

The method 200 comprises determining the weight metric as described herein (Block 202) and transmitting the weight metric to the management node 28. (Block 204). The method 200 further comprises balancing load amongst the capillary-cellular gateways 24 based on instructions (e.g. based on a request from the management node 28 as described above) received from the management node 28 in response to the transmitted weight metric, by moving the entire collective load to a different capillary-cellular gateway, or reducing the weight metric by shedding load. (Block 206).

Figure 5:
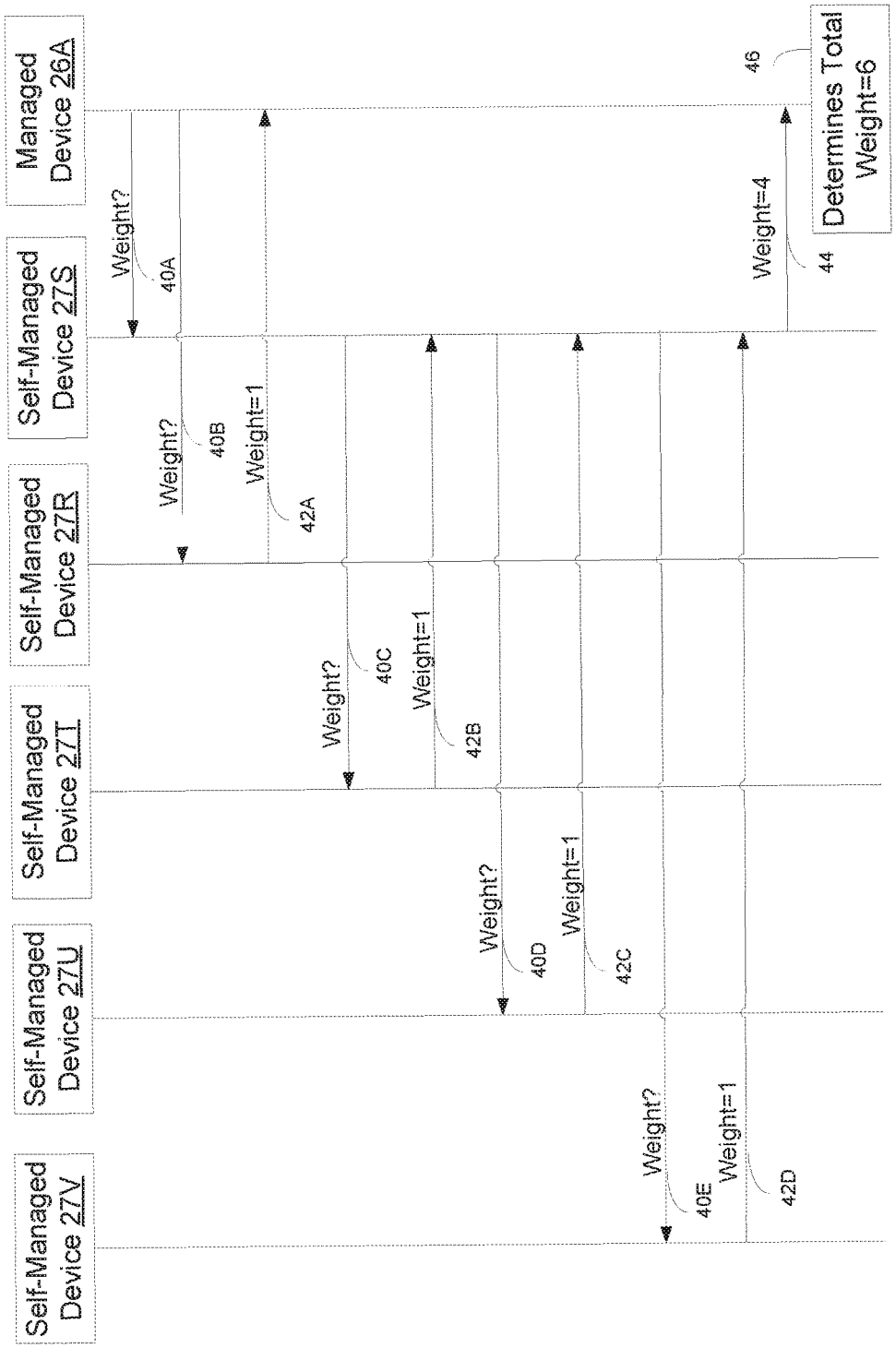
FIG. 5 depicts a logic flow diagram according to one or more embodiments herein.

As described above, the transmitted weight metric in some embodiments is the number of nodes behind the managed device 26 (including the managed device 26 itself). FIG. 5 shows an example signaling diagram where a given managed device 26A in the network architecture of FIG. 3 determines a weight metric (e.g. to transmit to a management node 28) where the weight metric is the number of nodes behind the node.

In the example of FIG. 5, managed device 26A asks the self-managed devices 27R and 27S about their respective weights (e.g. by broadcasting one or more weight request messages 40A and 40B to devices within a communication range of managed device 26A). Self-managed device 26R is not relaying for any child nodes. Therefore, it assigns itself a weight of 1 and responds to managed device 26A with this weight in message 42A). Each of the self-managed devices 27 that receive the weight request and relay for other self-managed devices 27 broadcast that weight request to all its nodes (e.g. self-managed device 26S sends weight request messages 40C, 40D and 40E). When the messages reach the edge of the self-managed network (in this case self-managed devices 27T, 27U, 27V), the outer nodes realize that they are the last nodes. In some embodiments, they assign themselves a weight metric of the weight 1, as they only represent single nodes without child nodes. Once they have assigned the weight, they transmit that information (e.g. weight response messages 42B, 42C and 42D) to its ancestor nodes (e.g. self-managed device 26S). The ancestor node self-managed device 26S adds all the weight from its child nodes and its own weight and transfers its weight to its parent node (e.g. it transfers an aggregated response message to self-managed device 26A that indicates a weight of four). That operation is done until the last node of the given capillary 16 network has a weight. The managed device 26A gets the weights of its children and determines a total weight of 6 from summing its children and adding 1 (46). The managed device 26A in some embodiments transmits this determined weight metric to the management node 28.

The weight could be the number of nodes behind a managed device 26 (including device 26 itself) as shown in FIG. 5. However, in other embodiments the weight includes a property of a self-managed device and all the nodes that directly or indirectly connect through it. For example, the property could describe the traffic through the managed device 26. For example, the weight may refer to the number of messages generated by a node per time unit. The weight as aggregated from one or more self-managed devices connected through a managed device 26 could be determined by measuring the total number of messages generated of all nodes in a branch connected to the managed device 26.

In other embodiments, the weight is an estimation of the generated traffic per time unit. For example, the weight could be estimated without actually measuring the traffic (e.g. in environments where devices post data at a known constant interval).

In other embodiments, the weight metric indicates a battery level. A low battery level of a device may indicate for instance that the device is a greater load on a gateway than a device with a higher battery level. Indeed, a device with a low battery level may be transmitting and/or receiving more data than a device with a higher battery level.

Similarly, the weight metric may indicate a utilization level of a device, e.g., the utilization level of at least one managed device and/or of one or more self-managed devices for which the at least one managed device relays traffic.

In other embodiments, a weight is a number that defines a specific important requirement for the capillary network(s) 16. For example, the weight is a reservation parameter for QoS. Thus, a weight could be an administrative weight.

In some embodiments, the management node 28 balances load based on receiving a weight metric and other information along with the weight metric for a managed device 26. For example, the weight metric and other information could be a combination of information used to determine a weight metric at the management node 28. For example, the management node 28 receives both the number of nodes behind a managed device 26 as a weight metric and battery level information of the self-managed device 26 and each node connected to the self-managed device 26. From this weight metric and other information, the management node 28 in some embodiments balances load based on receiving the weight metric and other information.

In one or more embodiments, the management node 28 receives weight metrics from several managed devices 26. The management node 28 in order to balance load between capillary-cellular gateways 24 maps which capillary-cellular gateways 24 can connect to which devices of a given capillary network 16. For example, the management node 28 creates a reachability map 60 as shown in FIG. 6 with the information about which gateways can connect to which devices.

Figure 6:
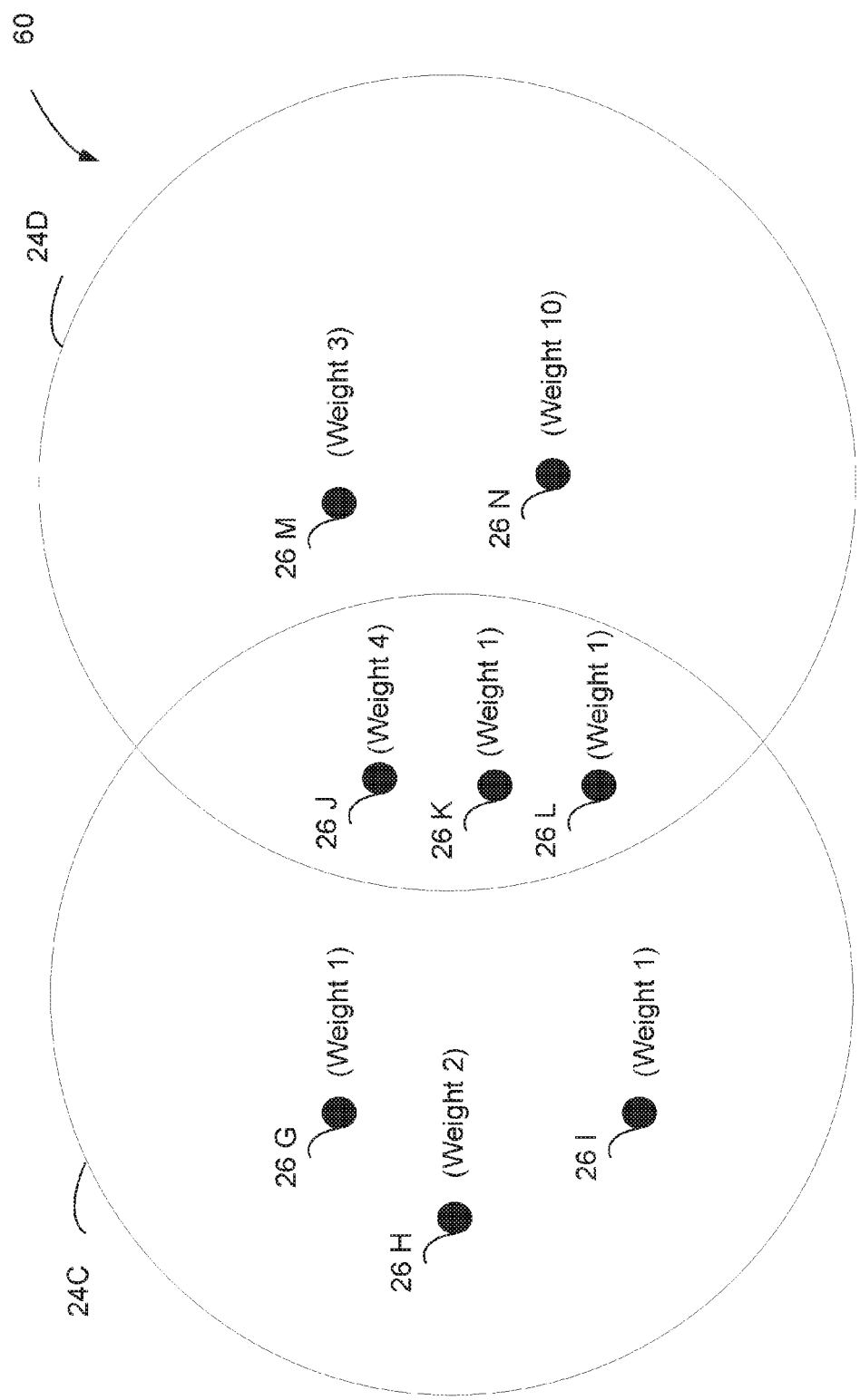
FIG. 6 depicts a reachability map according to one or more embodiments herein.

FIG. 6 shows a reachability map 60 for a given network architecture (e.g. a network architecture within a wireless communication network 10) where the management node 28 manages devices connected to two capillary-cellular gateways 24C and 24D. The group of devices under the control of a capillary-cellular gateway is a domain. In some embodiments, a given domain may include different short-range networks. The management node 28 distributes all the managed devices 27 in the available networks of its domains. The management node takes into consideration the load of the different domains as well as the weight of the different managed devices 27.

The management node 28 in some embodiments includes in the reachability map 60 received or determined information related to each of the managed devices 26. For example, as shown in FIG. 6, each managed device 26G-26N has a corresponding weight for its connection to a given capillary-cellular gateway 24.

In some embodiments, load balancing is achieved through adjusting weights. For example, all of the devices (e.g. managed devices 26G-26N) and all the capillary-cellular gateways 24 (e.g. capillary-cellular gateways 24C and 24D) of capillary network(s) 16 will have a weight that the management node 28 will adjust.

In one or more embodiments, the management node 28 receives aggregated weight values from each managed device 26. Even if it cannot see the individual self-managed nodes 27, it has a numeric view of the effect of moving a device, i.e., via the aggregated weight values. There is the possibility that once a managed device 27 moves to a different capillary-cellular gateway, the load of that capillary-cellular gateway becomes too high. For example, this occurs due to the third-party nodes (e.g. self-managed nodes 27) carried with the managed device 27 because they connect through the managed device 27. The management node 28 should have some method to distribute all that load among different capillary-cellular gateways 24 in the network. Embodiments herein advantageously allow load distributing (e.g. where load is defined with multiple properties).

The management node 28 can use weight to optimize the load-balancing decision. For example, the management node 28 in selecting amongst capillary-cellular gateways 24 for a given managed device 26 selects to keep the load balanced between the capillary-cellular gateways 24, even if there are nodes connecting through them indirectly. Even if the management node 28 cannot identify the nodes and the topology of nodes indirectly connected, it can still balance the load indirectly.

As shown in FIG. 6, in some embodiments one or more managed devices 26 are reachable by more than one capillary-cellular gateway (e.g. managed devices 26J, 26K and 26L can connect to capillary-cellular gateway 24C and/or 24D). For example, managed device 26J is connected and registered to capillary-cellular gateway 24C. The managed device 26J shares its weight with the management node 28. The management node 28, for example, finds it appropriate to move the managed device 26J from capillary-cellular gateway 24C to capillary-cellular gateway 24D. The managed device 26J, rather than leaving the nodes under it behind, will move itself to the capillary-cellular gateway 24D, and it will bring with it self-managed devices connected to the managed device 26J.

Figure 7:
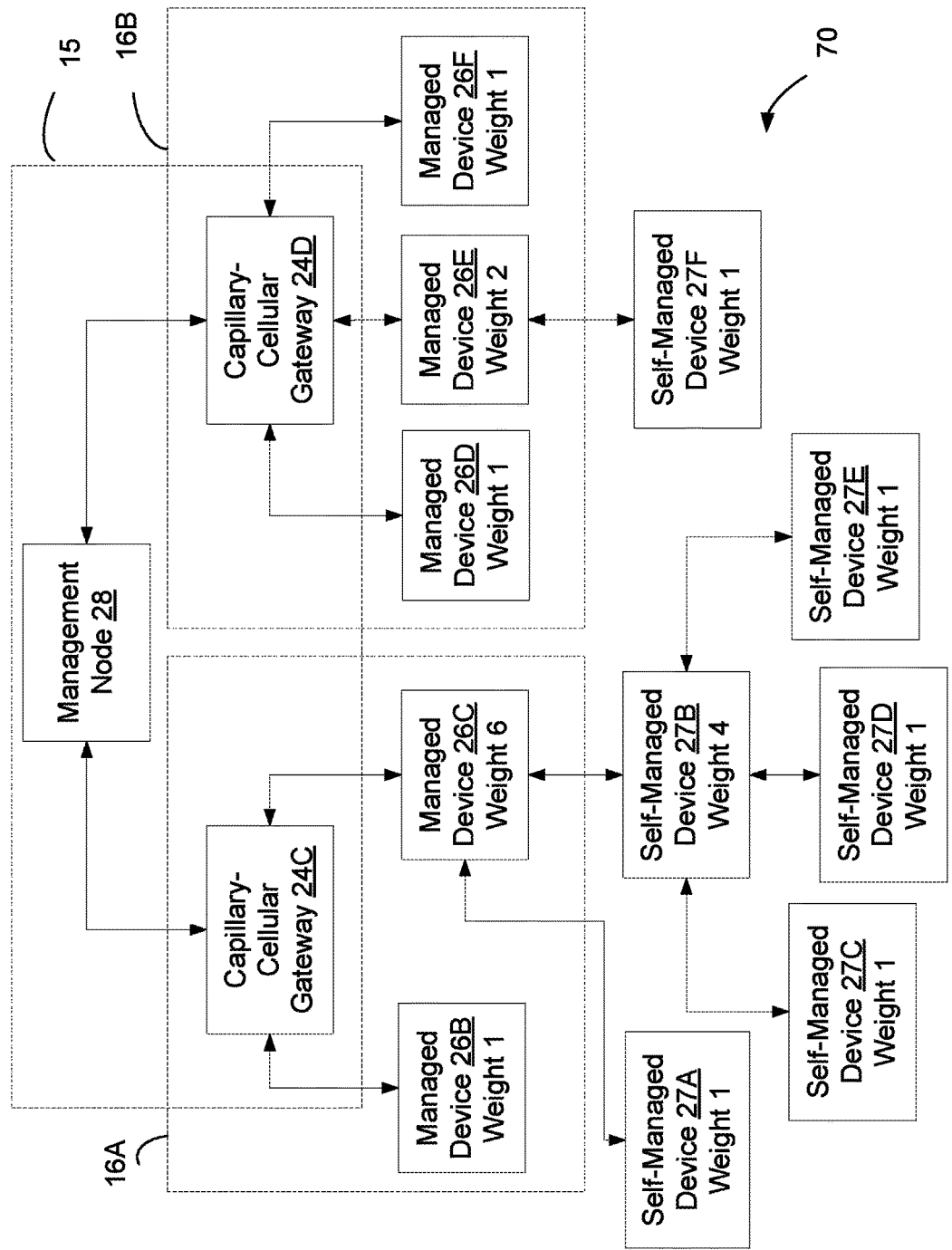
FIG. 7 depicts a block diagram including management node, managed devices and self-managed devices according to one or more embodiments herein.

FIG. 7 shows an example network architecture 70 according to embodiments herein. The architecture has two tiers: a managed capillary network tier that consists of the managed devices 27 under direct control under a management node 28 and the self-managed capillary network tier that consists of groups of self-managed devices 27 connected directly or indirectly to some of the managed devices 26.

As shown in FIG. 7, the management node 28 manages multiple managed devices 26B-26F with each connected to a capillary-cellular gateway 24C or 24D. Capillary-cellular gateway 24C is in a first capillary network 16A and capillary-cellular gateway 24D is in a second capillary network 16B. Collectively, the managed devices 26 and capillary-cellular gateways 24 belong to a managed capillary network tier. Two of the managed devices 26, managed devices 26C and 26E, act as an access point to a set of devices outside the managed capillary network tier in the self-managed capillary network tier. Managed device 26C is serving as access point for five self-managed devices, self-managed devices 27A-27E, and device 26E is serving just one extra self-managed device 27F.

The management node 28 of the cellular network 15 does not know anything directly about those self-managed devices 27. For instance, they could use a mesh topology and a routing protocol, such as RPL, for routing the messages among them.

The capillary network(s) 16 could collapse if unknown nodes (e.g. self-managed devices 27) connect randomly to the nodes of capillary network 16 (e.g. connect without the management node 28's knowledge or authorization).

According to embodiments herein, random unknown nodes are allowed to connect to capillary network 16 and the management node 28 is able to balance the load between capillary-cellular gateways (e.g. to prevent a given capillary network 16 from collapsing from any additional load by a self-managed device 27).

In one or more embodiments, the managed device 26 is aware of the identity of a self-managed device 27 for which the managed device 26 relays traffic. For example, the self-managed device 27F has in some embodiments a numeric identifier. The management node 28 does not know this identity, and is only aware of the presence of the self-managed device 27F through the transmitted weight metric.

In some embodiments, the self-managed devices have a numeric identifier that is randomly generated, is a hard-coded value, or is itself a weight metric.

In one or more embodiments, each self-managed device has a respective numeric identifier that falls within a range (e.g. randomly generated numeric identifiers). A management node 28 in some embodiments requests at least one managed device 26 reduce its weight metric by shedding load. This request in some embodiments comprises transmitting a request to at least one managed device 26 that identifies a first portion of the numeric range that is less than the entire numeric range. The request is made to disconnect from the at least one managed device 26 any self-managed devices 27 whose numeric identifiers are within the first portion of the numeric range. The managed device 27 sheds load based on the request (e.g. sheds a self-managed device 27 with an identifier that falls within the first portion of the numeric range). For example, the managed device 26 transmits a request to self-managed device(s) 27 that connect to the cellular network 15 through the managed device 26.

In some embodiments, the managed device 26 requesting that self-managed device(s) 27 disconnect from the managed device 26 and connect to another capillary-cellular gateway. For example, the managed device identifies the first portion to indicate which self-managed device(s) 27 that the managed device requests to disconnect (either by actively disconnecting the self-managed devices 27 or allowing the self-managed devices 27 to disconnect).

Figure 8:
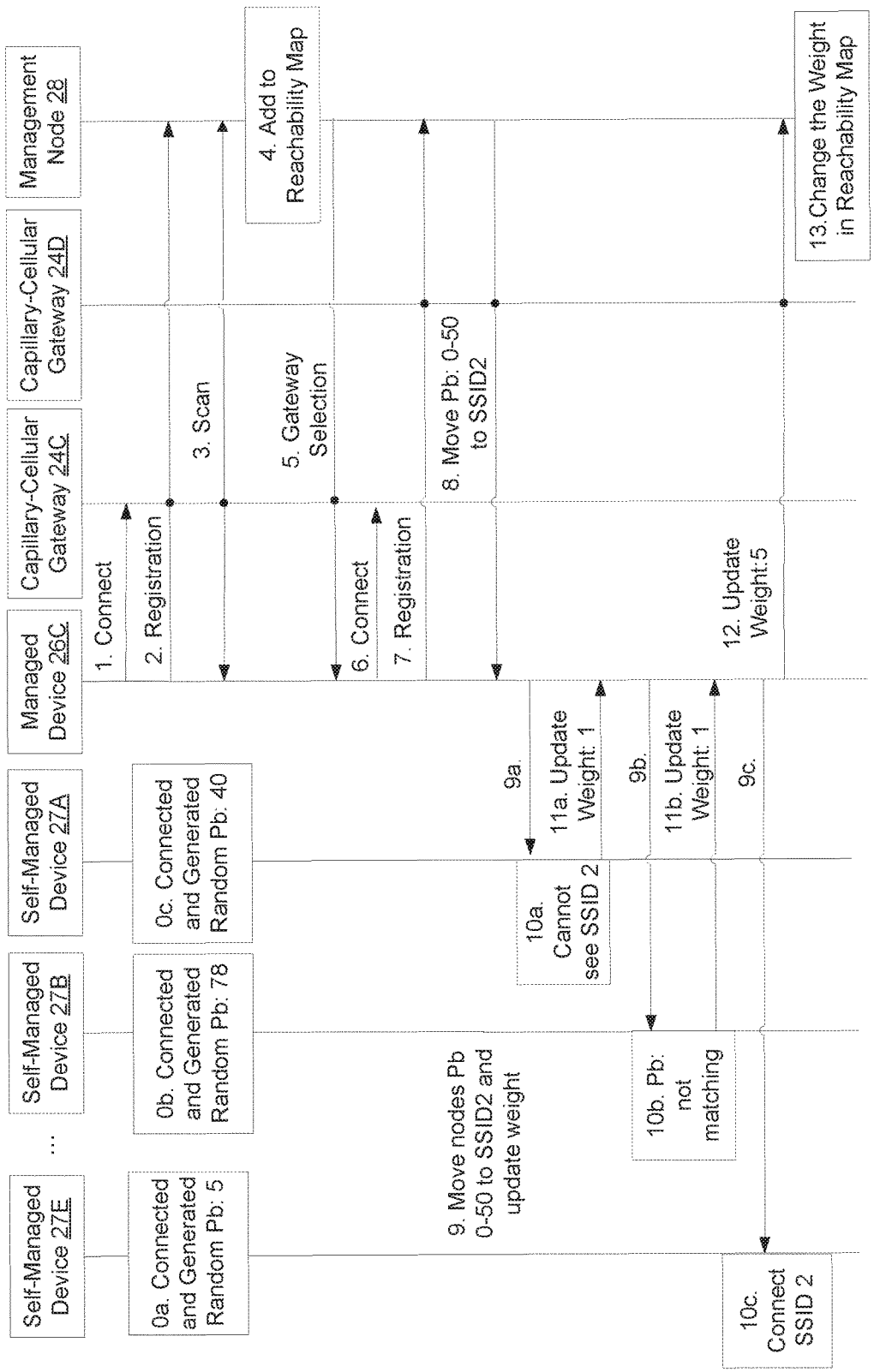
FIG. 8 depicts a logic flow diagram according to one or more embodiments herein.

FIG. 8 shows an example signaling diagram according to embodiments herein where a managed device 26C requests certain self-managed device(s) to disconnect from the managed device 26C. FIG. 8 is based on the network architecture of FIG. 7 and shows signaling between some of the devices in this network architecture. For instance, FIG. 8 shows one way of releasing some of the load from managed device 26C in a capillary network 16A that carries a set of third-party nodes (self-managed devices 27A-27E).

As shown in FIG. 8, the self-managed devices have connected to the managed device 26C and have generated a random identifier (e.g. at 0a, 0b and 0c). The managed device (1) connects to a capillary-cellular gateway 24C and (2) registers with that gateway 24C and management node 28. The management node 28 manages the managed device 26C. For instance, a managed device 26C in some embodiments receives instructions from the management node 28. For example, the management node 28 (3) instructs the managed device 26C to scan and report back to the management node 28 information to add to a reachability map (e.g. reachability map 60). The management node 28 in some embodiments (5) instructs the managed device 26C to move from capillary-cellular gateway 24C to capillary-cellular gateway 24D. The management node 28 uses a gateway selection process as explained herein (e.g. to balance load among capillary-cellular gateways). The managed device 26C (6) connects to capillary-cellular gateway 24D and (7) registers with that gateway 24D and management node 28.

Once the managed device 26C registers to capillary-cellular gateway 24D, the management node 28 determines that the weight of managed device 26C is too high. It has weight 6 as shown in more detail in FIG. 7. The management node will then try to move some of the nodes under managed device 26C to another network.

In this example, the management node 28 uses a probabilistic approach or methodology. The probabilistic approach is an indirect way to manage third-party nodes in a capillary network. In the probabilistic approach every node from the self-managed network generates a random probabilistic (Pb) number (e.g. as shown in FIG. 8 the self-managed devices have generated a number from 0 to 100). Using those probabilistic numbers, the management node 28 will tell (8) to the managed device 26C to move all the self-managed devices from a portion of this range, probabilistic numbers from 0 to 50, to a new network to a different device (e.g. another managed device 26D) with SSID identifier 2 (SSID 2). The managed device 26C will send (9a-9c) a message to one or more of the self-managed devices 27 connected to it (e.g. self-managed devices 27A, 27B and 27E) to move self-managed devices with random generated numbers within the portion to the given network (e.g. network with SSID 2) and to send an updated weight toward managed device 26C.

In this scenario, the self-managed device 27E belongs to the probabilistic range from 0 to 50, and it can see the network with SSID 2. Thus, self-managed device 27E will move to the new network with SSID 2 (10c). In other embodiments, if self-managed device 27E had other self-managed devices 27 connecting to the cellular network 15 through it, these other self-managed devices 27 could be moved to the new network as well. In case of self-managed device 27B, its probabilistic number is higher than the number provided by the management node, and it will not move from its original network (10b). Self-managed device 27A lies within the range provided by the management node 28. However, self-managed device 27A cannot see any network with SSID 2 (10a), and it will stay in its original network too. Once all the self-managed nodes have received the management node 28's instructions, self-managed nodes will update their weights and inform a managed device to which they are connected. For example, self-managed devices 27A and 27B inform the managed device 26C of their updated weights in 9a and 9b, respectively (11a-11b). The managed device 26C will update its weight accordingly, and it will inform the management node about that (12).

In one or more embodiments, a managed device 26 (e.g. managed device 26C) updates a determined weight metric by determining whether any self-managed devices 27 have disconnected from the managed device 27 (e.g. self-managed device 27E). For example, the managed device 26C reports an updated weight metric to the management node 28. The management node 28 changes the weight with respect to the managed device 26C in the reachability map (13).

Thus, in some embodiments a network is able to learn about the self-managed devices 27. A capillary network 16 with self-managed nodes 27 is an adaptive system, meaning that the structure of the network will change in time. Self-managed devices 27 will join and leave and the capillary network 16 has to be able to adapt to those changes in some manner.

In one or more embodiments, the management node 28 balances load based on a detected load imbalance condition. For example, the management node 28 in some embodiments transmits a request that at least one managed device 26 move its entire collective load to a different capillary-cellular gateway 24 or reduce its weight metric by shedding load (e.g. 8 of FIG. 8). Subsequent to this request, the management node 28 receives an updated weight metric from each managed device 26 that the management node 28 connects to in the capillary network(s)16 (e.g. 11 of FIG. 8). If the updated weight metrics indicate that the load imbalance condition has not been resolved, the management node 28 transmits an additional request to the at least one managed device (e.g. managed device 26C) that identifies a second portion of the numeric range that is different than the first portion, to disconnect from the at least one managed device any self-managed devices whose numeric identifiers are within the second set of the numeric range.

In the same or different embodiments, a managed device 26 (e.g. managed device 26C) receives an indication from the management node 28 of a second portion of the numeric range that is different than the first portion and is also less than the entire numeric range. The managed device 26C transmits a request to self-managed devices 27 that connect to the cellular network 15 through the managed device 26C that identifies the second portion of the numeric range, to thereby request that the self-managed devices 27 whose numeric identifiers are within the second portion of the numeric range connect to the managed device 26 of the second one of the capillary-cellular gateways 24 (e.g. capillary-cellular gateway 24C).

For example, as shown in FIG. 8, only one node has moved and the weight of the management node has decreased by one. The management nodes, after updating its reachability map, could try to apply new measures in the self-managed nodes of managed device 26C if appropriate. For example, the management node can repeat the process with increasing range of the affected probabilistic number, and in that way iterate until it gets an appropriate load balancing. For example, it can start with the range 0-20 and then expand it to range 0-40 and to 0-60 until the desired effect is accomplished.

The distribution of a particular load from a particular self-managed device might not be possible to move if the third-node devices must be connected to a specific capillary network's device (e.g. self-managed device 27A). However, in the cases that the third-party nodes are not so restrictive, the distribution of the nodes among the network is a solution to avoid overloading the capabilities of some of the capillary-cellular gateways 24.

In one or more embodiments a managed device 26 disconnects one or more of its self-managed devices 27 by disconnecting from a self-managed device 27. In the same or different embodiments, the managed device 26 disconnects one or more of its self-managed devices 27 by letting a self-managed device 27 disconnect itself based on its receipt of a request to connect to a managed device of a second one of the capillary-cellular gateways 24. For example, in some embodiments a given third-party node that a management node 28 seeks to indirectly move has the last word to decide to move to a new network. A third-party node might have many different constraints to avoid moving to another network but, in some cases, it might be more productive to the node to move under another network. Moving to a new network might increase its network bandwidth or decrease its latency as well.

In one or more embodiments, when a given device is moved to a new capillary-cellular gateway 24, all the nodes that belong to it, will move under that capillary-cellular gateway too. Embodiments describe a new load-balancing method for capillary network's nodes which carry other nodes that do not belong to any capillary network (16). Both types of nodes—capillary network's nodes and non-capillary network's nodes below them—are moved altogether to different capillary-cellular gateways 24 for better distribution of the load. Therefore, some advantages of embodiments includes moving a device belonging to a managed capillary network (16) and all its non-managed capillary network devices underneath, to move all together to a different capillary-cellular gateway 24.

Figure 9:
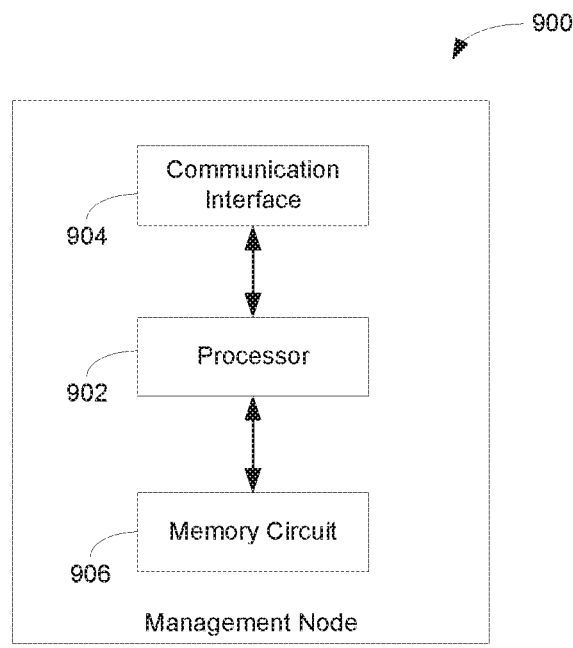
FIG. 9 depicts a block diagram of a management node according to one or more embodiments herein.

FIG. 9 illustrates an example management node 900 that may be used as the management node 28 and/or to implement the method 100. The management node 900 is used in a cellular network 15 and balances load amongst different capillary-cellular gateways 24 to indirectly account for load attributable to self-managed devices 27 not connected to the management node 900. The management node 900 includes one or more processing circuits (shown as "processor" 902), a communication interface 904, and a memory circuit 906. The processor 902 may include one or more microprocessors, microcontrollers, digital signal processors, or the like, for example. The memory circuit 906 may store instructions for storing programs and data used by the processor 902. The communication interface 904 facilitates communication between the management node 900 and nodes in capillary network 16 (e.g., devices 26 and capillary-cellular gateways 24). The communication interface 904 may include a radio transceiver in some embodiments (e.g., configured according to one or more 3GPP or 802.11 standards) and/or may include an Ethernet interface, for example.

The one or more processing circuits of processor 902, which are operatively connected to the memory circuit 906, are configured to determine, for each managed device 26 that the management node 900 connects to in the capillary network 16, a weight metric that describes a collective load attributable to not only the managed device 26 but also to any self-managed devices 27 that connect to the cellular network 15 via the managed device 26. The one or more processing circuits 902 are further configured to balance load amongst the capillary-cellular gateways 24 based on the weight metrics, by requesting that at least one managed device 26 move its entire collective load to a different capillary-cellular gateway 24, or reduce its weight metric by shedding load.

In one or more embodiments of the management node 900, the managed devices 26 and self-managed devices 27 use short-range radio access technology, the cellular network 15 uses long-range radio access technology, and the capillary-cellular gateways 24 use long-range radio access technology and short-range radio access technology.

A management node 900 could be a device connected to a packet data network 18 (e.g. management node 28 of FIG. 1). However, this is only an example, and it is understood that the management node 28 could reside in the cellular network (e.g. management node 28 of FIG. 7). The present disclosure relates to the application layer and the management of the nodes could be particularly done with the OMA-DM protocol, for example.

Figure 10:
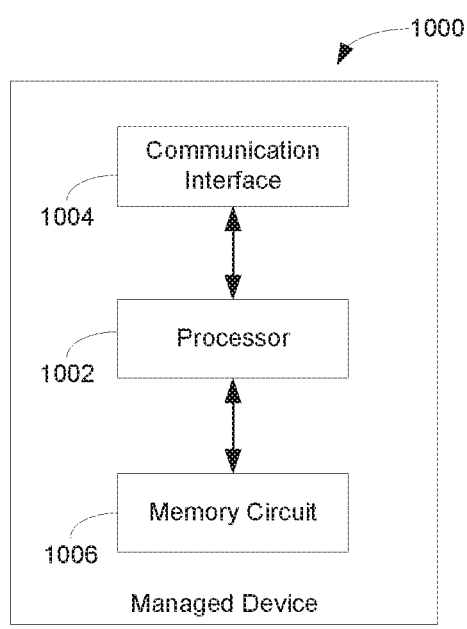
FIG. 10 depicts a block diagram of a managed device according to one or more embodiments herein.

FIG. 10 illustrates a managed device 1000 that may be used as a managed device 26 and/or to implement the method 200. The managed device 1000 is in a capillary network 16 that balances load amongst different capillary-cellular gateways 24 that connect the capillary network to a cellular network 15, to indirectly account for load attributable to self-managed devices 26 not connected to a management node 28. The managed device 1000 includes one or more processing circuits (shown as "processor" 1002), a communication interface 1004, a memory circuit 1006. The processor 1002 may include one or more microprocessors, microcontrollers, digital signal processors, or the like, for example. The memory circuit 1006, which is operatively connected to the processor 1002, may store instructions for storing programs and data used by the processor 1002. The communication interface facilitates communication between the device 1000 and nodes in a capillary network (e.g., self-managed devices 27 and capillary-cellular gateways 24).

The one or more processing circuits of processor 1002 are operatively connected to the memory, and are configured to determine a weight metric that describes a collective load attributable to not only the managed device 1000 but also to any self-managed devices 27 that connect to the cellular network via the managed device 1000, and transmit the weight metric to a management node 28. The one or more processing circuits of processor 1002 are further configured to balance load amongst the capillary-cellular gateways 24 based on instructions received from the management node 28 in response to the transmitted weight metric, by moving the entire collective load to a different capillary-cellular gateway 24, or reducing the weight metric by shedding load.

In one or more embodiments of the managed device 1000, the managed device 1000 and self-managed devices 27 use short-range radio access technology, the cellular network 15 uses long-range radio access technology, and the capillary-cellular gateways 24 use long-range radio access technology and short-range radio access technology.

In some embodiments, long-range radio access technology (e.g. used in the cellular network 15) includes one or more 3rd Generation Partnership Project standards such as Long Term Evolution (LTE), Wideband Code Division Multiple Access 8W-CDMA) or Global System for Mobile Telecommunications (GSM).

In some embodiments, short-range radio access technology (e.g. used by devices and gateways of capillary network (s) 16) includes, for example any variants of Wi-Fi (e.g., 802.11 a/b/g/n, 802.11 ah, etc.), all 802.15.4 based technology including ZigBee, traditional Bluetooth, Bluetooth Low Energy, ANT, Dash7, WirelessHART, Z-Wave, ISA 100.11a, CoAP, and/or MQTT. The methods described in the present disclosure are generic enough to operate on multiple short-range technologies (such as BLE, Wi-Fi or ZigBee) and any IoT protocols (such as CoAP or MQTT).

Embodiments herein are applicable for implementing a lightweight load-balancing scheme for multi-hop capillary network(s) 16 without requiring collecting detailed state of all nodes in the capillary network(s) 16. Embodiments herein provide for management that is transparent to devices (e.g. self-managed devices 27) that do not have direct access to a capillary-cellular gateway. These devices can also use a technology differing from the one in the managed capillary-network. For example, embodiments herein apply advantageously to IoT devices. In the near future, there may be multiple capillary-cellular gateways 24 within reach of the IoT devices offering communication services with different properties. The capillary network(s) 16 should be able to direct the IoT devices to the best capillary-cellular gateways 24. The method that leads IoT devices to the best capillary-cellular gateway is called gateway selection. Besides leading the IoT devices to the best candidate, the gateway selection method distributes the workload between the different CGWs. Due to the gateway selection method, the capillary network(s) may be self-configurable without requiring any human interaction. The devices will connect automatically to the optimal capillary-cellular gateway. The decision-making process—what gateway a device chooses for connectivity—is fully automated and takes into consideration a number of network and gateway properties. That decision is made by a central node in the cellular network 15 (e.g. a management node 28). Network parameters—such as the quality of the cellular link—and gateway parameters—such as the load of a gateway—are some of the requirements for selecting the optimal capillary-cellular gateway. Embodiments herein allow a management node 28 to control the capillary network(s) 16's nodes and the nodes that do not belong to the network in an easy manner and being in compliance with gateway selection mechanism (e.g. for gateway selection for IoT devices).

| Abbreviation | Explanation |
| --- | --- |
| BLE | Bluetooth Low Energy |
| CGW | Capillary-cellular gateway |
| CoAP | Constrained Application Protocol |
| GSM | Global System for Mobile Telecommunications |
| IoT | Internet of Things |
| LTE | Long Term Evolution |
| MQTT | Message Queue Telemetry Transport |
| OMA-DM | Open Mobile Alliance Device Management |
| RAN | Radio Access Network |
| RPL | IPv6 Routing Protocol for Low-Power and Lossy Networks |
| QoS | Quality of Service |
| SSID | Service Set Identifier |
| W-CDMA | Wideband Code Division Multiple Access |

What is claimed is:

1. A method, implemented by a management node that directly manages one or more managed devices in one or more capillary networks, for balancing load amongst different capillary-cellular gateways to indirectly account for load attributable to self-managed devices that are not directly managed by the management node, the method comprising:
   determining, for each of the one or more managed devices, a weight metric that describes a collective load attributable to not only the managed device but also to any self-managed devices that connect to a cellular network via the managed device; and
   balancing load amongst the capillary-cellular gateways based on the weight metrics, by requesting that at least one managed device move its entire collective load to a different capillary-cellular gateway or reduce its weight metric by shedding load;
   wherein each self-managed device has a respective numeric identifier that falls within a range, and wherein said requesting that the at least one managed device reduce its weight metric by shedding load comprises transmitting a request to the at least one managed device that identifies a first portion of the numeric range that is less than the entire numeric range, to disconnect from the at least one managed device any self-managed devices whose numeric identifiers are within the first portion of the numeric range.

2. The method of claim 1, wherein the respective numeric identifiers are randomly generated.

3. The method of claim 1, wherein the respective numeric identifier for each self-managed device is a hard-coded value.

4. The method of claim 1, wherein the respective numeric identifier for each self-managed device is the weight metric of the device.

5. The method of claim 1, wherein said balancing load is performed based on a detected load imbalance condition, the method further comprising:
  subsequent to the transmitting of the request that at least one managed device move its entire collective load to a different capillary-cellular gateway or reduce its weight metric by shedding load, receiving an updated weight metric from each managed device that the management node connects to in the one or more capillary networks; and
  if the updated weight metrics indicate that the load imbalance condition has not been resolved, transmitting an additional request to the at least one managed device that identifies a second portion of the numeric range that is different than the first portion, to disconnect from the at least one managed device any self-managed devices whose numeric identifiers are within the second set of the numeric range.

6. A method, implemented by a managed device in a capillary network, for balancing load amongst different capillary-cellular gateways to indirectly account for load attributable to self-managed devices that are not directly managed by a management node, wherein at least one of the capillary-cellular gateways connects the capillary network to a cellular network, the method comprising:
  determining a weight metric that describes a collective load attributable to the managed device and any self-managed devices that connect to the cellular network via the managed device;
  transmitting the weight metric to the management node; and
  balancing load amongst the capillary-cellular gateways based on instructions received from the management node in response to the transmitted weight metric, by moving the entire collective load to a different capillary-cellular gateway, or reducing the weight metric by shedding load;
  wherein the managed device is connected to a first capillary-cellular gateway, and wherein reducing the weight metric by shedding load comprises:
    remaining connected to the first capillary-cellular gateway;
    disconnecting one or more of its self-managed devices; and
    requesting that any of its self-managed devices which are to be disconnected connect to a managed device of a second one of the capillary-cellular gateways;
  wherein the first capillary-cellular gateway is in a first capillary network and the second one of the capillary-cellular gateways is in a second capillary network; and
  wherein each self-managed device has a respective numeric identifier that falls within a range, and wherein said shedding load comprises transmitting a request to self-managed devices that connect to the cellular network through the managed device, the request identifying a first portion of the numeric range that is less than the entire numeric range, to thereby request that the self-managed devices whose numeric identifiers are within the first portion of the numeric range connect to the managed device of the second one of the capillary-cellular gateways.

7. The method of claim 6, wherein the respective numeric identifiers are randomly generated.

8. The method of claim 6, wherein the respective numeric identifier for each self-managed device is a hard-coded value.

9. The method of claim 6, wherein the respective numeric identifier for each self-managed device is the weight metric of the device.

10. The method of claim 6, the method further comprising:
  receiving an indication from the management node of a second portion of the numeric range that is different than the first portion and is also less than the entire numeric range; and
  transmitting a request to self-managed devices that connect to the cellular network through the managed device that identifies the second portion of the numeric range, to thereby request that the self-managed devices whose numeric identifiers are within the second portion of the numeric range connect to the managed device of the second one of the capillary-cellular gateways.

11. A management node that directly manages one or more managed devices in one or more capillary networks, for balancing load amongst different capillary-cellular gateways to indirectly account for load attributable to self-managed devices that are not directly managed by the management node, the management node comprising processing circuitry configured to:
  determine for each of the one or more managed devices, a weight metric that describes a collective load attributable to not only the managed device but also to any self-managed devices that connect to a cellular network via the managed device; and
  balance load amongst the capillary-cellular gateways based on the weight metrics, by requesting that at least one managed device move its entire collective load to a different capillary-cellular gateway or reduce its weight metric by shedding load;
  wherein each self-managed device has a respective numeric identifier that falls within a range, wherein said shedding load comprises transmitting a request to self-managed devices that connect to the cellular network through the managed device, the request identifying a first portion of the numeric range that is less than the entire numeric range, to thereby request that the self-managed devices whose numeric identifiers are within the first portion of the numeric range connect to the managed device of the second one of the capillary-cellular gateways, and wherein the respective numeric identifiers are randomly generated.

12. A managed device in a capillary network that balances load amongst different capillary-cellular gateways to indirectly account for load attributable to self-managed devices that are not directly managed by a management node, wherein at least one of the capillary-cellular gateways connects the capillary network to a cellular network, the managed device comprising processing circuitry configured to:
  determine a weight metric that describes a collective load attributable to the managed device and any self-managed devices that connect to the cellular network via the managed device;
  transmit the weight metric to the management node; and
  balance load amongst the capillary-cellular gateways based on instructions received from the management node in response to the transmitted weight metric, by moving the entire collective load to a different capillary-cellular gateway, or reducing the weight metric by shedding load;

wherein each self-managed device has a respective numeric identifier that falls within a range, wherein said shedding load comprises transmitting a request to self-managed devices that connect to the cellular network through the managed device, the request identifying a first portion of the numeric range that is less than the entire numeric range, to thereby request that the self-managed devices whose numeric identifiers are within the first portion of the numeric range connect to the managed device of the second one of the capillary-cellular gateways, and wherein the respective numeric identifiers are randomly generated.

* * * * *